UNITED STATES PATENT OFFICE.

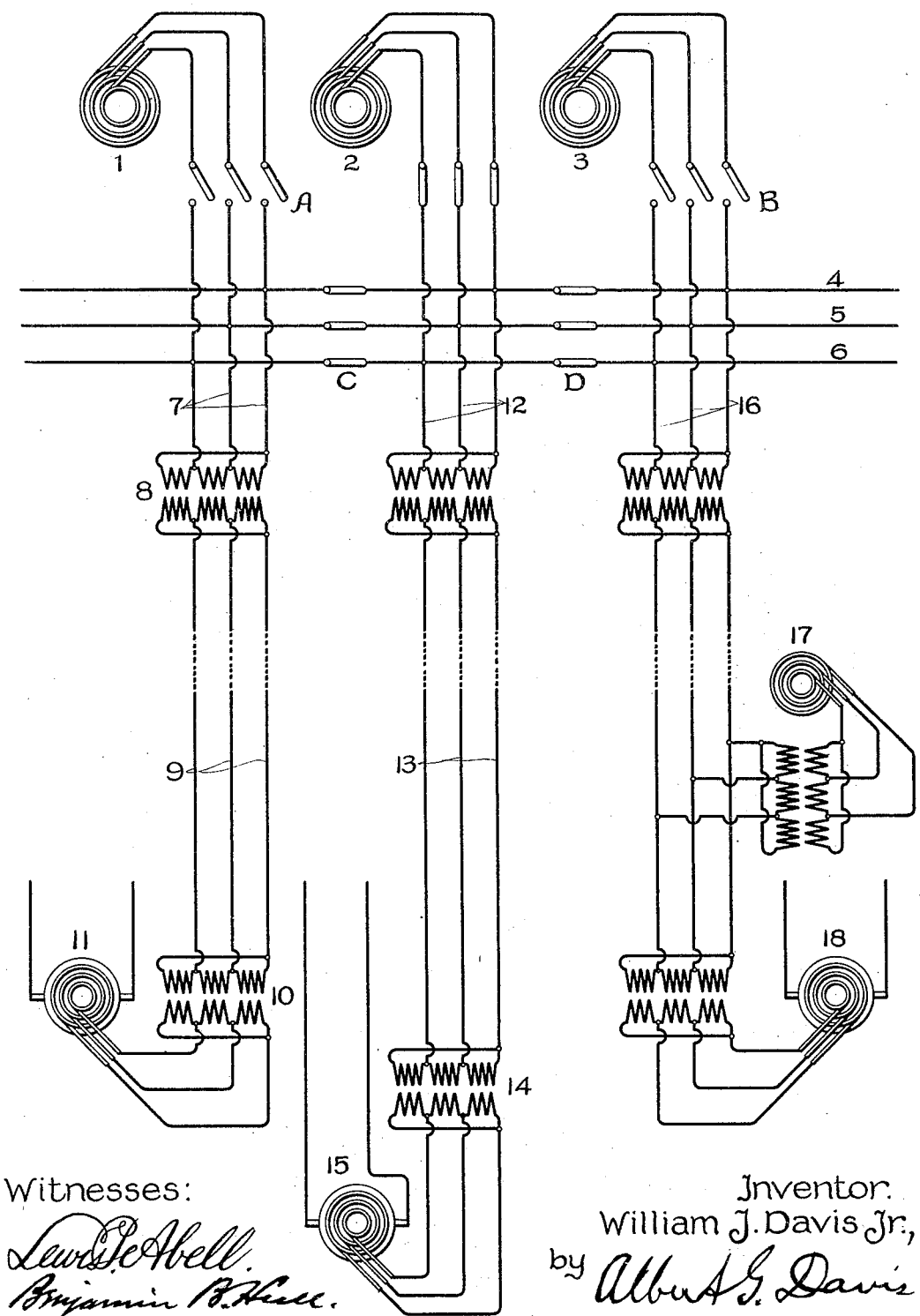

WILLIAM J. DAVIS, JR., OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 656,578, dated August 21, 1900.

Application filed June 29, 1900. Serial No. 22,044. (No model.)

*To all whom it may concern:*

Be it known that I, WILLIAM J. DAVIS, Jr., a citizen of the United States, residing at Schenectady, in the county of Schenectady, State of New York, have invented certain new and useful Improvements in Systems of Electrical Distribution, (Case No. 1,432,) of which the following is a specification.

In systems of electrical power distribution involving the operation of rotary converters or other synchronous apparatus from a single alternating-current power-station it has been found in practice that the synchronous apparatus is apt to hunt or pump in cases where there is a considerable ohmic drop in the conductors connecting the synchronous machines. To secure stable operation of the synchronous apparatus, it has heretofore been found necessary to make use of excessive amounts of copper for the purpose of securing low ohmic resistance of the line conductors through the medium of which the interaction takes place between the synchronous machines. As the tendency to hunt or pump is greatest at heavy loads or overloads when the ohmic drop is greatest, the system must be designed with a view to preventing hunting at these loads, and considered with respect to the normal load on the system the amount of copper used is much greater than would be the case were it not for the necessity of providing for stable operation of the synchronous apparatus during the periods of heavy or overloads. My invention involves a certain mode of operation whereby the amount of copper in the transmission-lines is greatly reduced; and it consists in a rotary converter installation, for example, in operating each rotary converter or group of converters from a separate generator during times of overload and in multiple with each other from a single generator or group of generators during light loads. By so doing I eliminate the tendency of the rotary converters to hunt when the load on the main generating station is heavy, while when the load is light I secure economy of operation by concentrating the load of all of the synchronous apparatus upon one generator or group of generators. In this case the transmission-lines leading to the rotary converters or other synchronous apparatus may often be such as to require as low as fifty per cent. of the copper that would be necessary were all the synchronous apparatus to be operated in multiple at heavy loads.

Briefly characterized, my invention consists in running the synchronous machines in multiple at light loads, while at heavy loads each machine or groups of machines are separately supplied from an independent source of current.

The drawings represent an arrangement of apparatus suitable for carrying out my invention.

At 1, 2, and 3 are shown in diagram three alternating-current generators of the three-phase type. Each of these generators is connected to bus-bars 4, 5, and 6, from which extend sets of feeders for supplying substations containing rotary converters, synchronous motors, or the like. The feeders 7 pass first to a step-up transformer 8, the secondary terminals of which are connected with feeders 9, leading to a step-down transformer 10, from which in this instance is fed a rotary converter 11, supplying current to a suitable consumption-circuit. The feeders 12 likewise supply current through a transmission-line 13, leading to another substation containing a step-down transformer and rotary converter, (indicated, respectively, at 14 and 15.) At 16 I have indicated still another set of feeders leading to a similar transmitting and distributing system consisting in this instance of a synchronous motor 17 and a rotary converter 18. As the character of the distribution or transmission systems may be widely varied, I have considered it unnecessary to do more than indicate a type of system suitable for the application of my invention; but it will be understood that wide variations may be made in laying out the system without departing from the spirit of my invention.

The bus-bars 4 5 6 are provided with switches C D, whereby they may be divided into sections, thereby isolating the sets of feeders 7, 12, and 16 from each other. The sets of leads extending from each generator 1 2 3 are also provided with switches, whereby the corresponding machines may be connected to or disconnected from the bus-bars. Thus the generator 1 may be thrown into or out of operation by means of a set of switches A, while the generator 3 may be similarly connected or disconnected by means of a set of switches B.

In cases of light load the synchronous apparatus is supplied in multiple from the generating-station, while at the station the number of generators employed is reduced accordingly, so that they may operate at full capacity, and thus with high efficiency. The drawings illustrate the connections as they would exist at light loads, the generators 1 and 3 being cut out of circuit, while the generator 2 operates to supply current to the bus-bars 4 5 6, and thus to all of the feeders leading to the substations. At times of heavy or overload the sets of switches A and B are closed, while the switches C and D are opened, thereby causing each substation or transmission-line to be fed from its own generator. In this case the feeders 7 receive current only from the generator 1, the feeders 12 only from the generator 2, and the feeders 16 from the remaining generator 3. By thus maintaining an independent supply of energy to each substation the hunting of the various sets of synchronous converters, due to interaction on the same distribution system, is prevented, thereby allowing the system to be designed with such an amount of copper in the feeders and other conductors as may be necessary at normal or low loads.

When there happens to be an unequal distribution of load, whereby some of the feeder-circuits are heavily loaded, while others are not, the feeder circuit or circuits thus heavily loaded may be separated from each of the others and each fed from independent sources of power. Thus, for example, suppose the feeder-circuit 16 to be heavily loaded, while the feeder-circuits 9 and 13 are carrying but a small load. Under these circumstances the switches D may be opened, thereby separating the heavily-loaded circuit from the others, while power may be supplied by closing the switches B of the separate generator 3. It is obvious that many other cases may occur in which the beneficial results of my invention may be obtained.

What I claim as new, and desire to secure by Letters Patent of the United States, is—

1. The method of supplying power to synchronous apparatus, which consists in operating the machines in multiple at light loads, and independently at heavy loads.

2. The method of supplying power to rotary converters or other synchronous apparatus, which consists in operating the machines in multiple when the hunting tendency of the machines is negligible, and at other times operating the machines independently.

3. The method of operating a rotary converter or other synchronous machine which consists in running it in multiple with other synchronous apparatus, and at times running it independently.

4. The method of operating a rotary converter or other synchronous machine which consists in supplying it from a source of power common to other synchronous apparatus, and at times supplying it from an independent source of power.

5. The method of operating a rotary converter or other synchronous machine which consists in supplying it from a source of current common to other synchronous apparatus, and at times supplying it from an independent source of current.

6. The method of operating a plurality of feeder-circuits supplying current to synchronous machines, which consists in supplying each heavily-loaded feeder-circuit or group of circuits from a source of power separate from the source or sources of supply of the lightly-loaded feeder circuit or circuits.

7. The method of operating a synchronous machine which consists in running it in multiple with other machines when its hunting tendency is negligible, and at other times running it independently.

In witness whereof I have hereunto set my hand this 25th day of June, 1900.

WILLIAM J. DAVIS, Jr.

Witnesses:
BENJAMIN B. HULL,
MABEL H. EMERSON.